United States Patent
Yoshikawa

[11] Patent Number: 5,182,738
[45] Date of Patent: Jan. 26, 1993

[54] OBJECTIVE LENS ACTUATOR USING A BALANCE WEIGHT THEREIN

[75] Inventor: Kikuo Yoshikawa, Kawasaki, Japan

[73] Assignee: Canon Kabushiki Kaisha, Tokyo, Japan

[21] Appl. No.: 884,231

[22] Filed: May 11, 1992

Related U.S. Application Data

[63] Continuation of Ser. No. 784,734, Oct. 28, 1991, abandoned, which is a continuation of Ser. No. 605,482, Oct. 30, 1990, abandoned.

[30] Foreign Application Priority Data

Nov. 10, 1989 [JP] Japan .................. 1-291183

[51] Int. Cl.⁵ .................. G11B 7/00; G11B 7/08
[52] U.S. Cl. .................. 369/44.14; 369/44.21; 369/247; 369/251; 359/819
[58] Field of Search .......... 369/44.11, 44.14, 44.15, 369/44.22, 247, 248, 251, 254; 350/247, 252, 255; 359/813, 819, 823

[56] References Cited

U.S. PATENT DOCUMENTS

| 4,473,274 | 9/1984 | Yano | 369/44.15 X |
|---|---|---|---|
| 4,571,026 | 2/1986 | Maruta | 350/255 X |
| 4,679,903 | 7/1987 | Kasahara | 350/255 X |
| 4,687,296 | 8/1987 | Terayama | 350/215 X |
| 4,818,066 | 4/1989 | Nose | 350/247 |
| 4,861,138 | 8/1989 | Suzuki | 350/347 X |
| 4,962,999 | 10/1990 | Kasuga | 350/255 X |

FOREIGN PATENT DOCUMENTS

| 0212941 | 3/1987 | European Pat. Off. . |
| 0371799 | 6/1990 | European Pat. Off. . |
| 0177439 | 9/1985 | Japan | 369/44.15 |

Primary Examiner—Aristotelis Psitos
Assistant Examiner—Nabil Hindi
Attorney, Agent, or Firm—Fitzpatrick, Cella, Harper & Scinto

[57] ABSTRACT

An objective lens actuator in which an objective lens for focusing a light beam on a recording medium is held in a lens holder, and the objective lens holder is held on a support shaft to be slidable in a direction of the optical axis of the objective lens and pivotal on a plane perpendicular to the optical axis direction includes a balance weight located on the holder to be substantially axially symmetrical with the objective lens. The balance weight includes a balance weight body having a predetermined mass, and a damper for supporting the balance weight body in the lens holder and for damping a vibration of the lens holder in cooperation with the balance weight body.

17 Claims, 4 Drawing Sheets

OBJECTIVE LENS ACTUATOR USING A BALANCE WEIGHT THEREIN

This application is a continuation of application Ser. No. 07/784,734 filed Oct. 28, 1991, which is a continuation of Ser. No. 07/605,482, filed Oct. 30, 1990, both now abandoned.

BACKGROUND OF THE INVENTION

1. Field of the Invention

The present invention relates to an objective lens actuator for performing focusing control or tracking control in an optical pickup device used in a compact disk player, an optical video disk player, an optical disk device, and the like.

2. Related Background Art

When a beam emitted from a light source is to be focused in a mode for optically recording information from an optical disk or reproducing it from the disk, the actuator performs so-called focus control so that an in-focus point of a focused beam (to be referred to as a beam spot hereinafter) traces a disk recording surface in accordance with changes in surface level of the disk. At the same time, the actuator performs so-called tracking control so that the beam spot traces recording tracks in accordance with eccentricity of the recording tracks.

When a target track is to be accessed, an optical head is moved by a linear motor to a predetermined position, and an objective lens position is then finely adjusted.

In order to perform the above control operations, the actuator comprises a means for driving an objective lens in a direction of thickness of the optical disk (i.e., an optical axis of the objective lens) and a means for driving the objective lens in a radial direction of the optical disk (i.e., a direction perpendicular to the optical axis) to perform tracking control or fine adjustment for accessing the target track.

A conventional example of an actuator having the above arrangement is shown in FIG. 1. An objective lens 1 is fixed in a lens holder 3. The lens holder 3 is held on a support shaft 6 at the central portion of the lens holder 3 so as to be slidable in the axial direction and pivotal in the direction of rotation. The shaft 6 is mounted on a base (not shown). A balance weight 2 is mounted in the lens holder 3 to be axially symmetrical with the objective lens 1, so that the center of gravity of the lens holder 3 is located at the axial center of the support shaft 6 (see FIG. 2). A focusing coil 4 is wound around the outer circumferential surface of the lens holder 3. Tracking coils 5a, 5b, 5c, and 5d are mounted in the peripheral portion of the lens holder 3 at predetermined angular intervals. In order to generate a magnetic field crossing the coils 4, 5a, 5b, 5c, and 5d, magnets 7a and 7b are located on both sides of the lens holder 3. The magnets 7a and 7b are supported on outer yokes 8a and 8b. Inner yokes 9a and 9b are continuous with the outer yokes 8a and 8b on their bottom surfaces. The inner yokes 9a and 9b are inserted into through holes 12a and 12b formed in the lens holder 3.

During focusing control, when a current is supplied to the focusing coil 4 in a clockwise or counterclockwise direction, an electromagnetic force acts in a direction of the support shaft 6 in a gap formed between the left and right magnetic circuits (constituted by the magnets 7a and 7b, the outer yokes 8a and 8b, and the inner yokes 9a and 9b). The objective lens 1 is axially moved in correspondence with a change in surface level of the optical disk, so that the beam spot follows the recording surface of the disk.

During tracking control, when a current is supplied to each of the tracking coils 5a, 5b, 5c and 5d connected in series, in one direction or in the reverse direction thereof, an electromagnetic force acts about the support shaft 6 as rotation couple forces in a gap formed between the left and right magnetic circuits, so that the beam spot traces the recording tracks in accordance with eccentricity of the tracks.

In the above conventional arrangement, however, when the lens holder 3 which holds the objective lens 1 is to be driven in the focusing or tracking direction, these movable actuator components such as the lens holder 3 resonate at a natural resonant frequency thereof, thereby adversely affecting servo control. A sub-resonance occurring at a high frequency range of several hundreds of Hz to several tens of kHz causes degradation in accurate positioning (tracking of the beam spot for the changes in surface level of the disk and eccentricity of tracks) of the objective lens 4 and disables control.

SUMMARY OF THE INVENTION

The present invention has been made in consideration of the above situation, and has as its object to provide a simple objective lens actuator capable of performing good control of the objective lens actuator and easily reducing a sub-resonance amplitude.

In order to achieve the above object of the present invention, there is provided an objective lens actuator in an optical pickup device in which an objective lens for focusing a light beam on a recording medium is mounted in a lens holder; the lens holder is supported by a support shaft so as to be slidable in a direction of an optical axis of the objective lens and pivotal within a plane perpendicular to the optical axis direction, and a balance weight is arranged in the lens holder t be substantially axially symmetrical with the objective lens, wherein the balance weight comprises a balance weight body having a predetermined mass and a damper member, having viscoelastic properties, for supporting the balance weight body on the lens holder.

The above and other objects, features, and advantages of the present invention will be apparent from the following detailed description in conjunction with the accompanying drawings.

DETAILED DESCRIPTION OF THE PREFERRED EMBODIMENT

Figure 1:
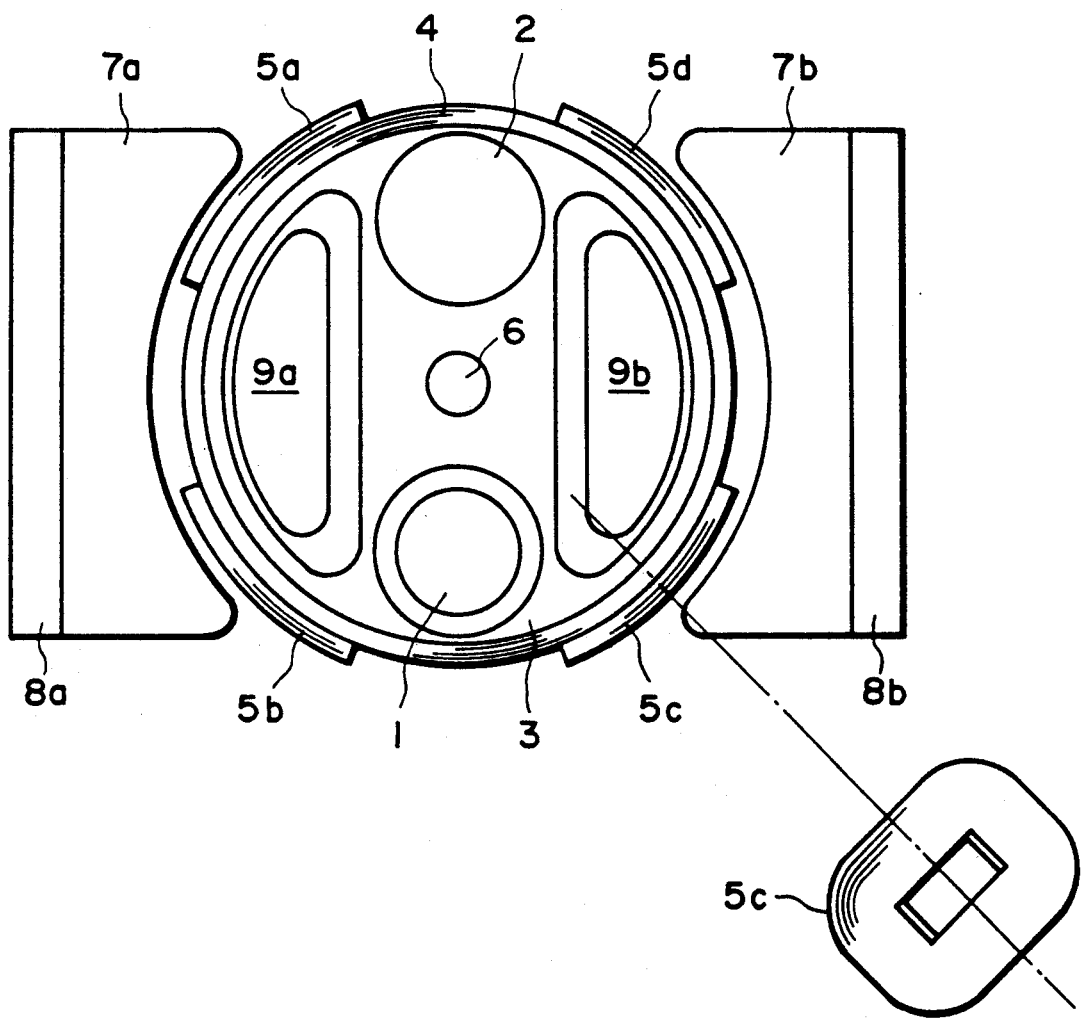
FIG. 1 is a plan view showing an arrangement of a conventional objective lens actuator.
Figure 2:
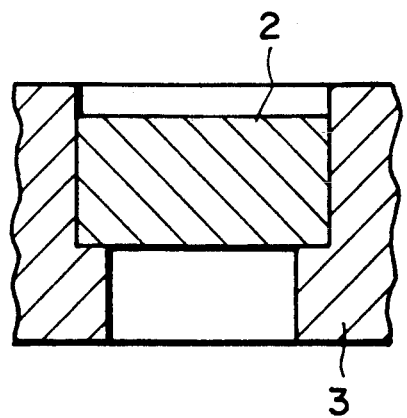
FIG. 2 is a longitudinal sectional view showing an arrangement of a balance weight of an objective lens actuator shown in FIG. 1.

An embodiment of the present invention will be described with reference to the accompanying drawings. The same reference numerals as in the conventional arrangement denote the same parts in the following embodiment, and a detailed description thereof will be omitted.

Figure 3:
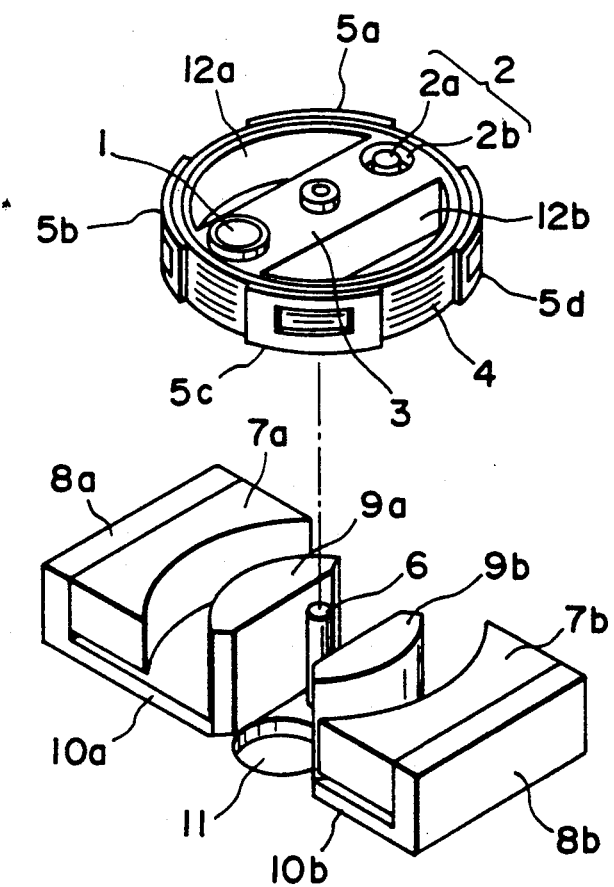
FIG. 3 is a perspective view showing an assembly of an objective lens actuator according to an embodiment of the present invention.
Figure 4:
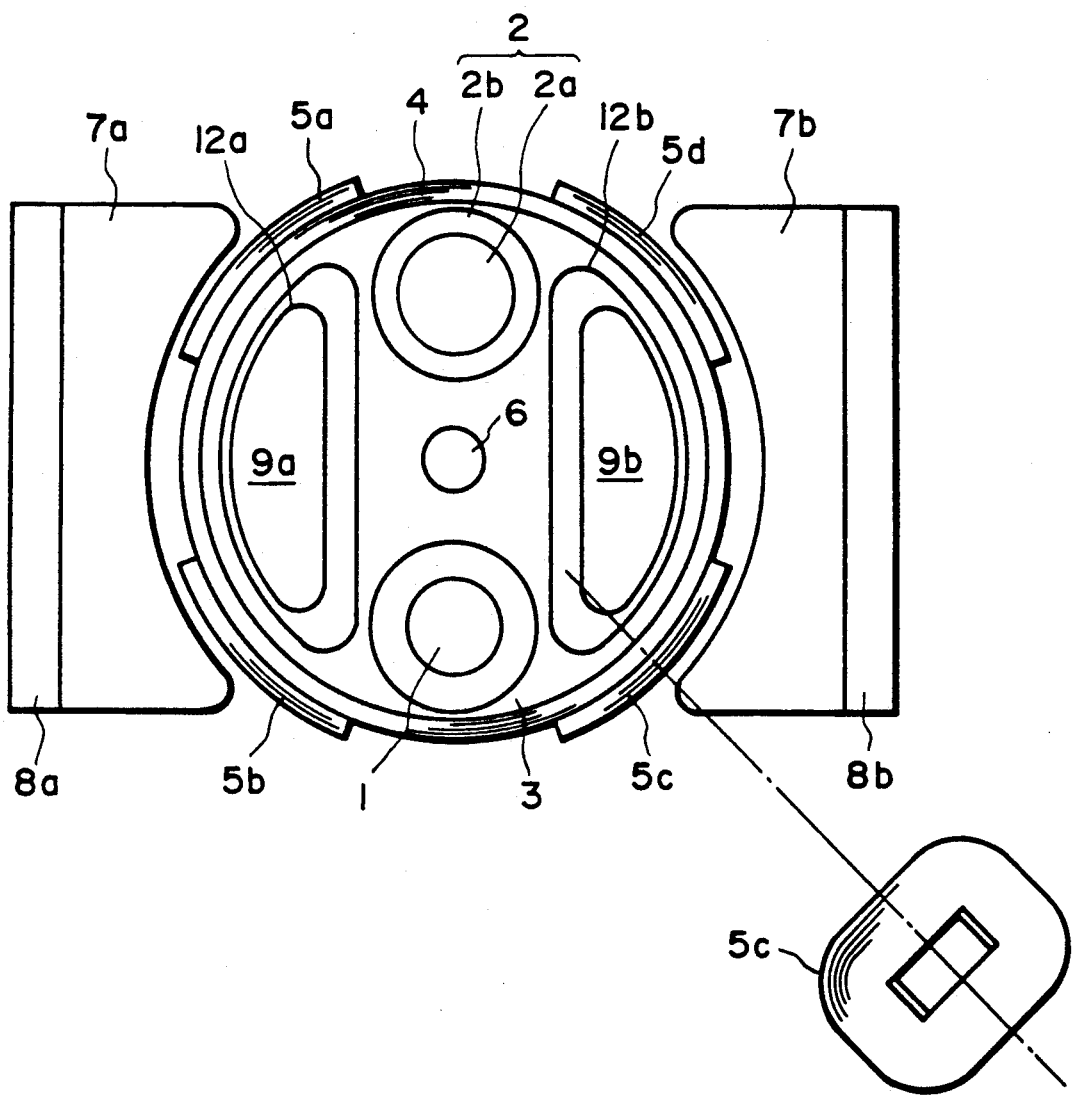
FIG. 4 is a plan view showing the assembly of the objective lens actuator shown in FIG. 3.

FIG. 3 is a perspective view showing an assembly of an objective lens actuator according to an embodiment of the present invention. Connecting yokes 10a and 10b connect an inner yoke 9a to an outer yoke 8a and an inner yoke 9b to an outer yoke 8b, respectively. A laser beam emitted from a laser source (not shown) passes through a hole 11 and is guided to an objective lens 1. The actuator comprises a balance weight body 2a and a damper member 2b for holding the balance weight body 2a to a lens holder 3. Note that the balance weight body 2a and the damper member 2b constitute a balance weight 2 as a whole. FIG. 4 is a plan view showing an assembly of FIG. 3.

An arrangement of the balance weight and its peripheral portion as a characteristic feature of the present invention is shown in FIG. 4. The balance weight comprises the cylindrical balance weight body 2a and the damper member 2b held to be not in contact with the lens holder 3. The damper member 2b has predetermined viscoelastic properties.

The damper member 2b is made of natural rubber, an ether-based polyurethane, or the like. The damper member 2b can be elastically deformed so that the balance weight body 2a can be slightly displaced in the focusing direction (vertical direction) and the tracking direction (right-and-left direction) and provides a damping effect for a given vibration (especially resonance) in a high-frequency range of the lens holder 3 (movable actuator member).

Figure 5:
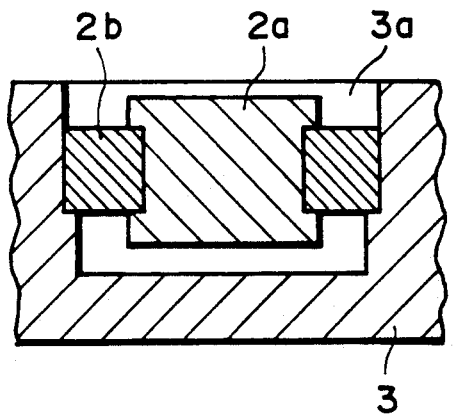
FIG. 5 is a longitudinal sectional view showing an arrangement of a balance weight of the objective lens actuator shown in FIGS. 3 and 4.
Figure 6:
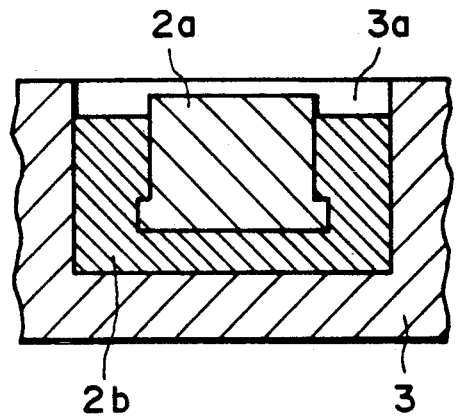
FIGS. 6 and 7 are longitudinal sectional views showing balance weight arrangements of the balance weight shown in FIG. 5.
Figure 7:
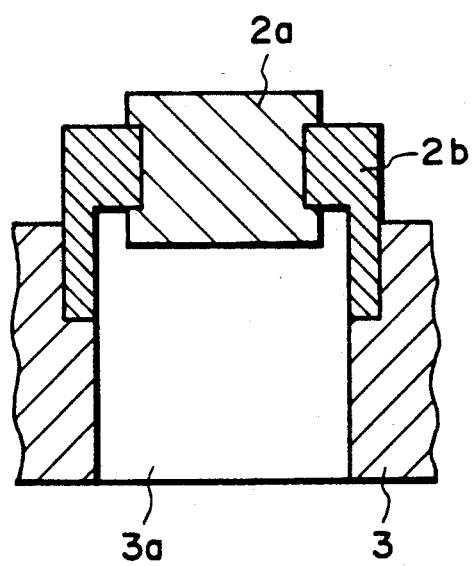

The damper member 2b may be a ring member which holds the balance weight body 2a which floats in a balance weight mounting hole 3a of the lens holder 3, as shown in FIG. 5. However, a shown in FIG. 6, the balance weight body 2a may be supported to be surrounded within the balance weight mounting hole 3a including the bottom surface of the balance weight body 2a. Alternatively, a damper member 2b may extend upward to support the balance weight body 2a in the upper portion thereof, as shown in FIG. 7.

The theory of the damping effect according to the present invention will be described with reference to FIG. 8.

Figure 8:
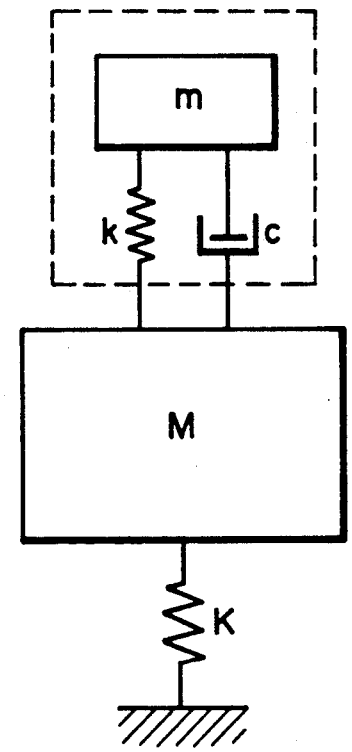
FIG. 8 is a view showing a vibration model for explaining a theory of attenuation effect according to the present invention.

FIG. 8 is a view showing a model of a vibration system of the embodiment of the present invention.

A small vibration system (i.e., a portion surrounded by a dotted rectangle) is added to a mechanism (M). A mass m, a spring constant k, and a damping efficiency c of the system are properly selected to damp motion (vibration) of the mechanism (M).

The portion surrounded by the dotted rectangle corresponds to the balance weight 2 of the present invention.

As has been described above, since a balance weight comprises a balance weight body and a damper member for elastically supporting the balance: weight body in a lens holder 3, the sub-resonance occurring during driving of the movable actuator members in the focusing or tracking direction can be damped, and accurate positioning and servo control of the objective lens can be performed. In addition, the objective lens actuator according to the present invention has a simple structure, low cost, and high reliability.

What is claimed is:

1. An objective lens actuator in an optical pickup device in which an objective lens for focusing a light beam on a recording medium is held in a lens holder, and said objective lens holder is held on a support shaft to be slidable in a direction of an optical axis of said objective lens and pivotal on a plane perpendicular to the optical axis direction, comprising:

a balance weight located on said holder to be substantially axially symmetrical with said objective lens, said balance weight comprising a balance weight body having a predetermined mass, and a damper member arranged between said balance weight body and said lens holder.

2. An actuator according to claim 1, wherein said damper member comprises a material having viscoelastic properties.

3. An actuator according to claim 2, wherein the material having the viscoelastic properties is natural rubber.

4. An actuator according to claim 2, wherein the material having the viscoelastic properties is ether-base polyurethane.

5. An actuator according to claim 1, further comprising a first coil, wound around said lens holder, for generating a sliding force, a second coil, located symmetrical with said first coil about said support shaft, for generating a pivotal force, and a permanent magnet and a yoke member which are located to oppose said first and second coils.

6. An objective lens actuator in an optical pickup device having a lens supporter holding an objective lens for focusing a light beam on a recording medium and being movable in a direction of an optical axis of said objective lens, comprising:

a balance weight located on said lens supporter, said balance weight comprising a balance weight body having a predetermined mass, and a damper member arranged between said balance weight body and said lens supporter.

7. An actuator according to claim 6, wherein said damper member comprises a material having viscoelastic properties.

8. An actuator according to claim 7, wherein the material having viscoelastic properties comprises natural rubber.

9. An actuator according to claim 7, wherein the material having the viscoelastic properties comprises ether-base polyurethane.

10. An optical information recording and reproducing apparatus utilizing a light beam for performing at least one of recording information on a recording medium and reproducing the information recorded on the recording medium, comprising:

an objective lens for focusing a light beam on said recording medium;

a lens holder for holding said objective lens;

a support shaft for holding said objective lens holder thereon to be slidable in a direction of an optical axis of said objective lens and pivotal on a plane perpendicular to the optical axis direction;

a balance weight located on said holder to be substantially axially symmetrical with said objective lens, said balance weight comprising a balance weight body having a predetermined mass, and a damper member arranged between said balance weight body and said lens holder; and a lens holder drive means for generating a drive force for causing said lens holder to be slidable in a direction of an optical axis of said objective lens and pivotal on a plane perpendicular to the optical axis direction.

11. An optical information recording and reproducing apparatus utilizing a light beam for performing at least one of recording information on a recording medium and reproducing the information recorded on the recording medium, comprising:

an objective lens for focusing a light beam on said recording medium;

a lens supporter slidable in a direction of an optical axis of said objective lens for holding said objective lens;

a balance weight located on said supporter, said balance weight comprising a balance weight body having a predetermined mass, and a damper member arranged between said balance weight body and said supporter; and supporter drive means for generating a drive force for causing said supporter to be slidable in a direction of an optical axis of said objective lens.

12. An actuator according to claim 1, wherein said damper member is arranged to prevent contact between the lens holder and said balance weight body.

13. An actuator according to claim 6, wherein said damper member is arranged to prevent contact between the lens supporter and said balance weight body.

14. A device according to claim 10, wherein said damper member is arranged to prevent contact between said lens holder and said balance weight body.

15. A device according to claim 10, wherein said damper member is arranged to prevent contact between said lens supporter and said balance weight body.

16. An objective lens actuator in an optical pickup device having a lens supporter holding an objective lens for focusing a light beam on a recording medium and being movable on a plane perpendicular to an optical axis direction of said objective lens, comprising:

a balance weight located on said supporter, said balance weight comprising a balance weight body having a predetermined mass, and a damper member arranged between said balance weight body and said supporter.

17. An optical information recording and reproducing apparatus utilizing a light beam for performing at least one of recording information on a recording medium and reproducing the information recorded on the recording medium, comprising:

an objective lens for focusing a light beam on said recording medium;

a lens supporter being movable on a plane perpendicular to an optical axis direction of said objective lens for holding said objective lens;

a balance weight located on said supporter, said balance weight comprising a balance weight body having a predetermined mass, and a damper member arranged between said balance weight body and said supporter; and supporter driving means for generating a driving force for moving said supporter on a plane perpendicular to the optical axis direction of said objective lens.

* * * * *

UNITED STATES PATENT AND TRADEMARK OFFICE
CERTIFICATE OF CORRECTION

PATENT NO. : 5,182,738
DATED : January 26, 1993
INVENTOR(S) : YOSHIKAWA

It is certified that error appears in the above-identified patent and that said Letters Patent is hereby corrected as shown below:

Column 2

Line 38, "t" should read --to--.

Column 3

Line 64, "balance:" should read --balance--.

Signed and Sealed this

Twenty-second Day of February, 1994

Attest:

BRUCE LEHMAN

Attesting Officer          Commissioner of Patents and Trademarks